Patented June 27, 1944

2,352,387

UNITED STATES PATENT OFFICE 2,352,387

PROCESS FOR THE PRODUCTION OF CONDENSATION PRODUCTS

Heinrich Hopff, August Weickmann, and Rudolf Kern, Ludwigshafen-on-the-Rhine, Germany, assignors to General Aniline & Film Corporation, New York, N. Y., a corporation of Delaware No Drawing. Application June 1, 1940, Serial No. 338,374. In Germany June 7, 1939

12 Claims. (Cl. 260—65)

The present invention relates to a process for the production of condensation products.

We have found that condensation products which are useful for quite a variety of applications are obtained by causing carbonyl compounds, i. e. aldehydes and/or ketones, to act upon aliphatic diamines containing more than 5 carbon atoms in the molecule.

Diamines suitable for the reaction are, for example, hexa-, octo-, deca-, undeca- and dodeca-methylene diamine. Among suitable aldehydes we may mention formaldehyde, acetaldehyde, crotonaldehyde, butyric aldehyde, succinic dialdehyde, benzaldehyde, benzaldehyde-2-carboxylic acid, phthalic aldehyde, isophthalic aldehyde and terephthalic aldehyde. Suitable ketones are, for example, acetone, methyl ethyl ketone, benzophenone, benzil, diacetyl and vinylmethylketone. Mixtures of different diamines and also mixtures of aldehydes and/or ketones may be used instead of single compounds.

By the reaction, depending on the working conditions applied and the diamines and aldehydes or ketones used, condensation products of a varying degree of condensation are obtained. The products of a relatively low degree of condensation are crystalline. They are suitable for example as plasticizers for the very highly condensed products; they may be further condensed, to form products of a higher degree of condensation. They pass various stages of condensation similar to heat-hardenable resins, such as phenol-aldehyde resins. In passing through the different stages of condensation they are transformed first into soluble and fusible products which are no longer crystalline or distillable, whereupon, on further condensation, for example under the influence of heat and pressure, they are converted into insoluble products and thus arrive at the final stage of the condensation. The condensation products obtained are considerably more elastic than the usual phenol resins.

The condensation may be carried out by merely mixing the initial materials or by heating them to elevated temperatures, if desired in solution. Usually temperatures below 100° C. are employed. The reaction proceeds with a considerable evolution of heat. The water formed in the condensation may be removed by means of water-binding agents or by azeotropic distillation. In advanced stages of the condensation the water which then separates from the reaction mixture, may be removed mechanically, the remaining parts being then distilled off during the further condensation.

The products which are no longer crystalline but have not yet been condensed to completion are soluble in ketones, alcohols and ethers and are suitable for lacquering purposes.

The more highly condensed products are suitable for use in the production of shaped articles, especially by molding, pressing or injection-molding.

The following examples serve to illustrate how the said invention may be carried out in practice, but the invention is not restricted to the said examples. The parts are by weight.

Example 1

A solution of 116 parts of hexamethylene diamine in 500 parts of methanol is run into an alcoholic solution of 134 parts of terephthalic aldehyde within half an hour, while stirring. After a short time the primary reaction product separates in the form of beautiful colorless crystals melting at 178° C. The crystals are filtered off by suction and further condensed by heating, if desired in vacuo, to form a clear colorless resin. The condensation may be discontinued at any point where it meets the demands of a certain application; for example if films, bands and like articles are aimed at, the condensation may be stopped when the product is viscous in the heat; if molding powders are desired the product is further condensed until it is fusible only by the application of pressure.

Example 2

280 parts of crotonaldehyde are added to 232 parts of hexamethylene diamine and 800 parts of methanol at a temperature slightly below 0° C. which is maintained by cooling with a mixture of ice and common salt. After 14 hours 200 parts of a formaldehyde solution of 40 per cent strength are introduced within two hours while stirring. The mixture is allowed to stand for several hours and the resulting condensation product is dried in vacuo. A very hard elastic resin is thus obtained.

Example 3

1 molecular proportion of hexamethylene diamine is mixed with 2 molecular proportions or more of vinyl methyl ketone; the temperature of the mixture rises so strongly that the mixture is brought to boiling. The reaction product may be further condensed or polymerized by heating, if desired in the presence of a peroxide.

*Example 4*

155 parts of crotonaldehyde are slowly run into 204 parts of ω.ω'-diamino-dipropyl ether of butanediol-1.4

$$(H_2N-C_3H_6-O-C_4H_8-O-C_3H_6-NH_2)$$

while well stirring. The temperature of the mass rises spontaneously and shortly after the reaction water begins to separate; after completion of the reaction the water is removed by distillation in vacuo. A very flexible resin is thus obtained which in its first stage of condensation is soluble in lacquer solvents, as for example acetic ester. The films obtained by causing the solvent to evaporate may be hardened by drying in the air or by heating.

What we claim is:

1. The process of producing condensation products which consists of condensing a primary aliphatic diamine containing at least 6 carbon atoms and only two amino groups with a monomeric carbonyl compound selected from the class consisting of aldehydes and ketones in the molecular ratio of about one carbonyl group of the carbonyl compounds for each amino group of the diamine.

2. The process of producing condensation products which consists of condensing a primary aliphatic diamine containing at least 6 carbon atoms and only two amino groups with a monomeric carbonyl compound selected from the class consisting of aldehydes and ketones in the molecular ratio of about one carbonyl group of the carbonyl compounds for each amino group of the diamine at a temperature below 100° C.

3. The process of producing condensation products which consists of condensing hexamethylene diamine with a monomeric carbonyl compound selected from the class consisting of aldehydes and ketones in the molecular ratio of about one carbonyl group of the carbonyl compounds for each amino group of the diamine.

4. The process of producing condensation products which consists of condensing hexamethylene diamine with a monomeric carbonyl compound selected from the class consisting of aldehydes and ketones in the molecular ratio of about one carbonyl group of the carbonyl compounds for each amino group of the diamine at a temperature below 100° C.

5. Condensation products which consist of a primary aliphatic diamine containing at least 6 carbon atoms and only two amino groups with monomeric carbonyl compounds selected from the class consisting of aldehydes and ketones in the molecular ratio of about one carbonyl group of the carbonyl compounds for each amino group of the diamine.

6. Condensation products which consist of hexamethylene diamine with monomeric carbonyl compounds selected from the class consisting of aldehydes and ketones in the molecular ratio of about one carbonyl group of the carbonyl compounds for each amino group of the diamine.

7. The process of producing condensation products which consists of condensing one molecular proportion of hexamethylene diamine with one molecular proportion of terephthalic aldehyde.

8. The process of producing condensation products which consists of condensing one molecular proportion of hexamethylene diamine with two molecular proportions of crotonaldehyde.

9. The process of producing condensation products which consists of condensing one molecular proportion of hexamethylene diamine with two molecular proportions of vinyl methyl ketone.

10. A product which consists of the condensation product obtained by condensing one molecular proportion of hexamethylene diamine with one molecular proportion of terephthalic aldehyde.

11. A product which consists of the condensation product obtained by condensing one molecular proportion of hexamethylene diamine with two molecular proportions of crotonaldehyde.

12. A product which consists of the condensation product obtained by condensing one molecular proportion of hexamethylene diamine with two molecular proportions of vinyl methyl ketone.

HEINRICH HOPFF.
AUGUST WEICKMANN.
RUDOLF KERN.